(12) United States Patent
Smith (10) Patent No.: US 8,616,571 B2
(45) Date of Patent: Dec. 31, 2013

(54) VEHICLE SPLASH GUARDS AND ADAPTORS THEREFOR

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 99 days.

(21) Appl. No.: 13/216,145

(22) Filed: Aug. 23, 2011

(65) Prior Publication Data

US 2013/0049320 A1 Feb. 28, 2013

(51) Int. Cl.
*B62D 25/18* (2006.01)

(52) U.S. Cl.
USPC .......................................... 280/154; 280/851

(58) Field of Classification Search
USPC ........... 280/847, 152.1, 152.3, 848, 154, 851, 280/852
See application file for complete search history.

(56) References Cited

U.S. PATENT DOCUMENTS

| | | | |
|---|---|---|---|
| 1,904,343 A | 4/1933 | Zaiger | |
| 3,279,818 A | 10/1966 | Jones | |
| 4,012,053 A | 3/1977 | Bode | |
| 4,334,694 A | 6/1982 | Iwanicki | |
| 4,382,606 A | 5/1983 | Lightle | |
| 4,564,204 A | 1/1986 | Sullivan | |
| 4,627,631 A | 12/1986 | Sherman | |
| 4,629,204 A | 12/1986 | Arenhold | |
| 4,796,906 A | 1/1989 | Sullivan | |
| 4,832,356 A * | 5/1989 | Liberto et al. | 280/851 |
| 4,921,276 A | 5/1990 | Morin | |
| 5,366,247 A | 11/1994 | Fischer | |
| 5,375,882 A | 12/1994 | Koch, III | |
| 5,564,750 A | 10/1996 | Bajorek | |
| 5,833,283 A | 11/1998 | Shaw | |
| 6,786,512 B2 | 9/2004 | Morin | |
| 7,625,013 B2 | 12/2009 | Kellick | |

FOREIGN PATENT DOCUMENTS

GB       2 049 590 A       12/1980

OTHER PUBLICATIONS

"Mudflap Made for Aerodynamic Efficiency," CCJ [Commercial Carrier Journal] Daily Report, Feb. 26, 2010, <http://www.ccjdigital.com/mudflap-designed-for-aerodynamic-efficiency/> [retrieved Oct. 7, 2010], 3 pages.

* cited by examiner

*Primary Examiner* — Jeffrey J Restifo
*Assistant Examiner* — Erez Gurari
(74) *Attorney, Agent, or Firm* — Christensen O'Connor Johnson Kindness PLLC (57) ABSTRACT

The vehicle splash guards and adaptors described herein aim to reduce drag forces caused by the splash guards thereby improving air flow characteristics around the splash guard. In that regard, the splash guards and adaptors may increase the overall fuel efficiency of the vehicle.

14 Claims, 9 Drawing Sheets

VEHICLE SPLASH GUARDS AND ADAPTORS THEREFOR

BACKGROUND

Figure 6:
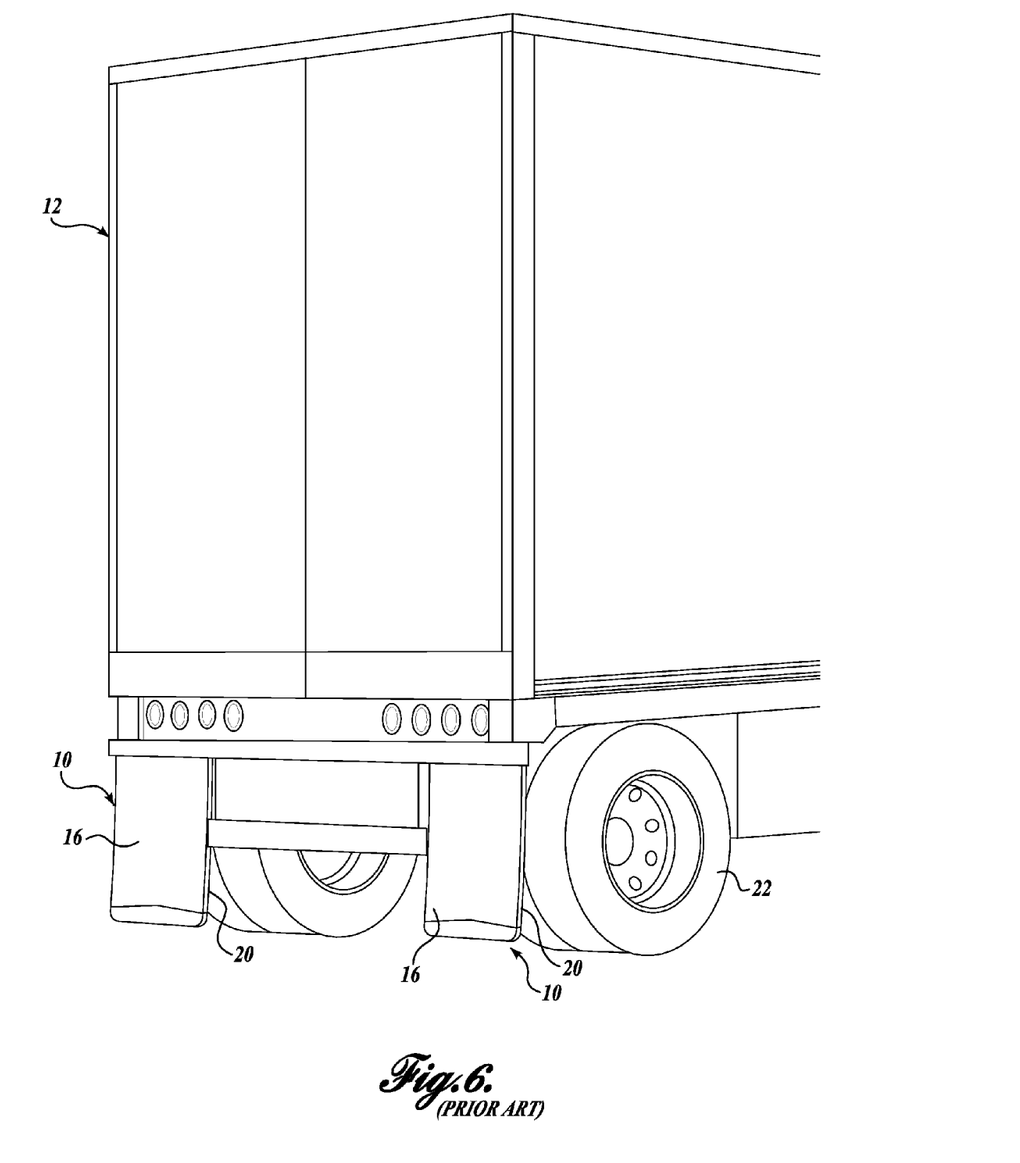
FIG. 6 is a schematic illustration of a vehicle showing a conventional splashguard.
Figure 7:
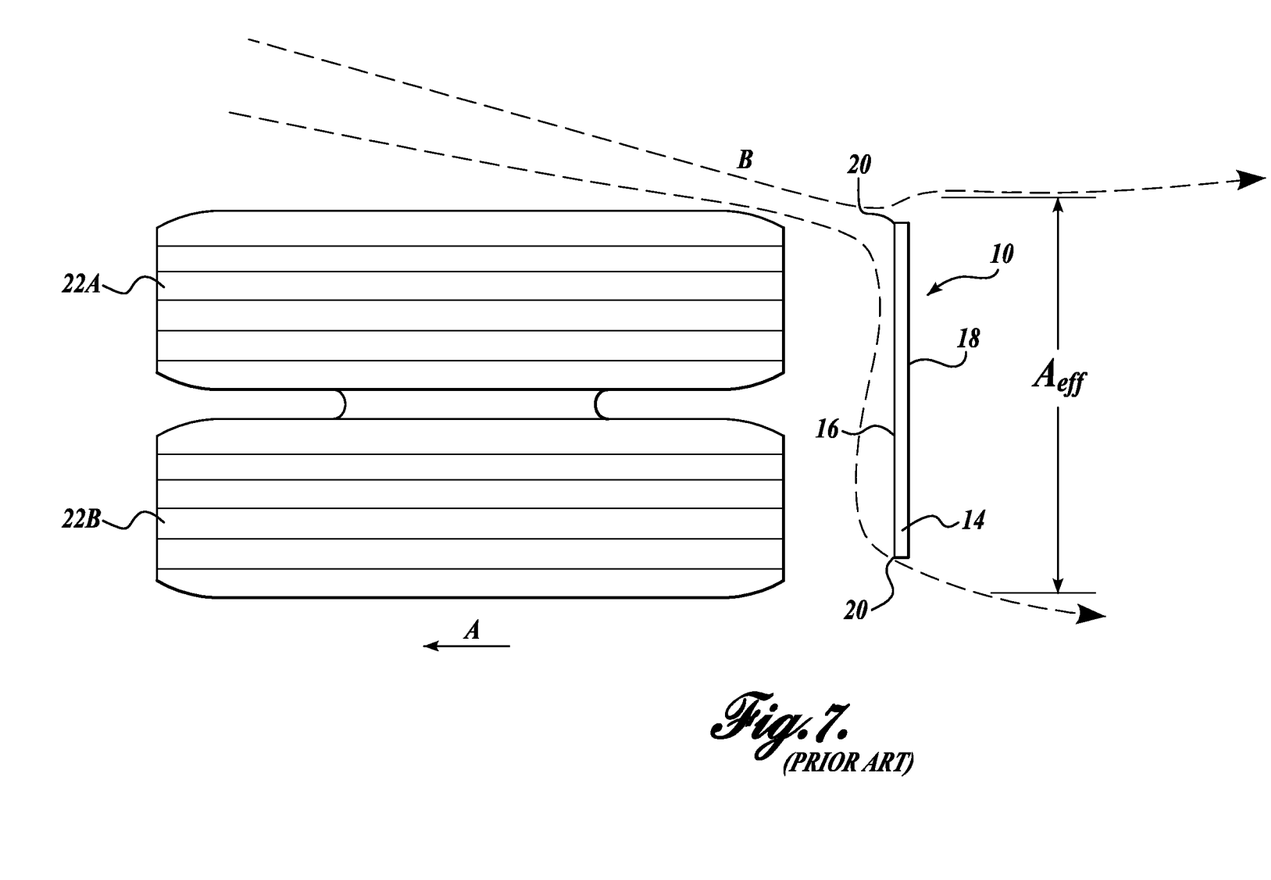
FIG. 7 is a partial plan view of the conventional splash guard of FIG. 6 installed on a vehicle and illustrating air flow around the splash guard when the vehicle is in forward motion.

Splash guards or mud guards are often used on vehicles to block debris that may be thrown into the air by the vehicle's rotating tires. In fact, splash guards are mandated on many vehicles, such as Class 8 vehicles. FIG. 6 is a schematic illustration of conventional splash guards 10 mounted on a Class 8 vehicle, such as semi-trailer 12. As best shown in FIG. 7, the splash guard 10 includes a thin planar body 14 defining a forward facing planar surface 16 (See FIG. 7) and a rearward facing surface 18. The perimeter of the forward facing surface 16 is formed by generally sharp leading edges 20. The splash guard 10 may be secured at its top end to the vehicle 12 in a conventional manner such that the forward facing surface 16 extends vertically at a spaced distance behind the vehicle's tire(s) 22. The planar, forward facing surface 16 is suitably positioned relative to the associated tire(s) to deflect debris, such as gravel, pebbles, mud, water, or the like, that is thrown into the air by the rotating tires 22.

In general, the planar surfaces 16 of the splash guards 10 are perpendicular to the direction of motion of the vehicle 12 thereby restricting air flow and generating drag forces on the vehicle. Turning to FIG. 7, there is shown a partial plan view of the conventional splash guard 10 of FIG. 6 mounted on one side of the vehicle 12 behind tires 22. As depicted, the tires 22 are arranged in a dual configuration, having an outside tire 22a located proximate the exterior of the vehicle 12 and an inside tire 22b located proximate the interior of the vehicle 12. As the tires 22 rotate in a clockwise direction, the vehicle 12 moves in the direction indicated by arrow A. As such, air flows past the exterior of the vehicle 12 including the outside tire 22a in a substantially opposite direction of vehicle motion as indicated by arrows B.

Although much of the surface area of the splash guards 10 are shielded by the tires, as can be seen in FIG. 7, some of the air flows against the splash guard 10 and is displaced by the splash guard 10 thereby generating drag forces. In fact, the area affected by the drag forces, referred to as $A_{eff}$, is larger than the area of the splash guard 10 itself. These drag forces act in the opposite direction of the vehicle's motion and thus effectively reduce the aerodynamic efficiency of the vehicle 12.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a vehicle splash guard is provided. The vehicle splash guard comprises a substantially planar body having a front surface and a rear surface opposite the front surface. The vehicle splash guard also includes one or more curved outer surfaces positioned radially outwardly of the front surface. The one or more curved outer surfaces extends from a leading edge to trailing outer edge. The vehicle splash guard further includes one or more protrusions extending outwardly from the rear surface.

In accordance with another aspect of the present disclosure, an adaptor for a vehicle splash guard is provided. The adaptor comprises a frame having a first side and a second side opposite the first side. The first side has one or more convex-shaped outer surfaces that extend from a leading edge to an outer trailing edge and the second side has one or more protrusions extending outwardly therefrom. The frame also has an attachment interface configured to secure the adaptor to a vehicle splash guard.

In accordance with anther aspect of the present disclosure, a vehicle splash guard assembly is provided. The assembly comprises a substantially planar body having a forward surface and a rearward surface opposite the forward surface, and a frame configured to be secured to the substantially planar body. The frame includes a forward side and a rearward side, wherein the forward side of the frame includes one or more curved outer surfaces positioned radially outwardly of the forward surface of the planar body when the frame is secured to the substantially planar body. Each outer surface extends from a leading edge to a trailing outer edge. The rearward side of the frame includes one or more protrusions extending outwardly therefrom.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments are described below, it will be appreciated that various changes can be made therein without departing from the spirit and scope of the claimed subject matter. In that regard, the detailed description set forth below, in connection with the appended drawings, is intended only as a description of various embodiments of the disclosed subject matter and is not intended to represent the only embodiments. The embodiments described in this disclosure are provided merely as an example or illustration and should not be construed as preferred or advantageous over other embodiments.

The following discussion proceeds with reference to examples of splash guards and splash guard adaptors suitable for use with vehicles, such as Class 8 trucks, trailers, etc.

Generally described, the splash guards and splash guard adaptors described herein aim to reduce drag forces caused by the splash guards thereby improving air flow characteristics around the splash guard, and in turn, improving the aerodynamics of the associated vehicle. As such, the splash guards and splash guard adaptors may increase the overall fuel efficiency of a vehicle.

Although exemplary embodiments of the present disclosure is described with reference to Class 8 trucks and/or trailers, it will be appreciated that aspects of the present disclosure have wide application, and therefore, may be suitable for use with many types of powered vehicles, such as passenger vehicles, buses, commercial vehicles, light and medium duty vehicles, and the like, as well as non-powered vehicles, such as trailers and the like. Accordingly, the following descriptions and illustrations herein should be considered illustrative in nature, and thus, not limiting the scope of the claimed subject matter.

Figure 1A:
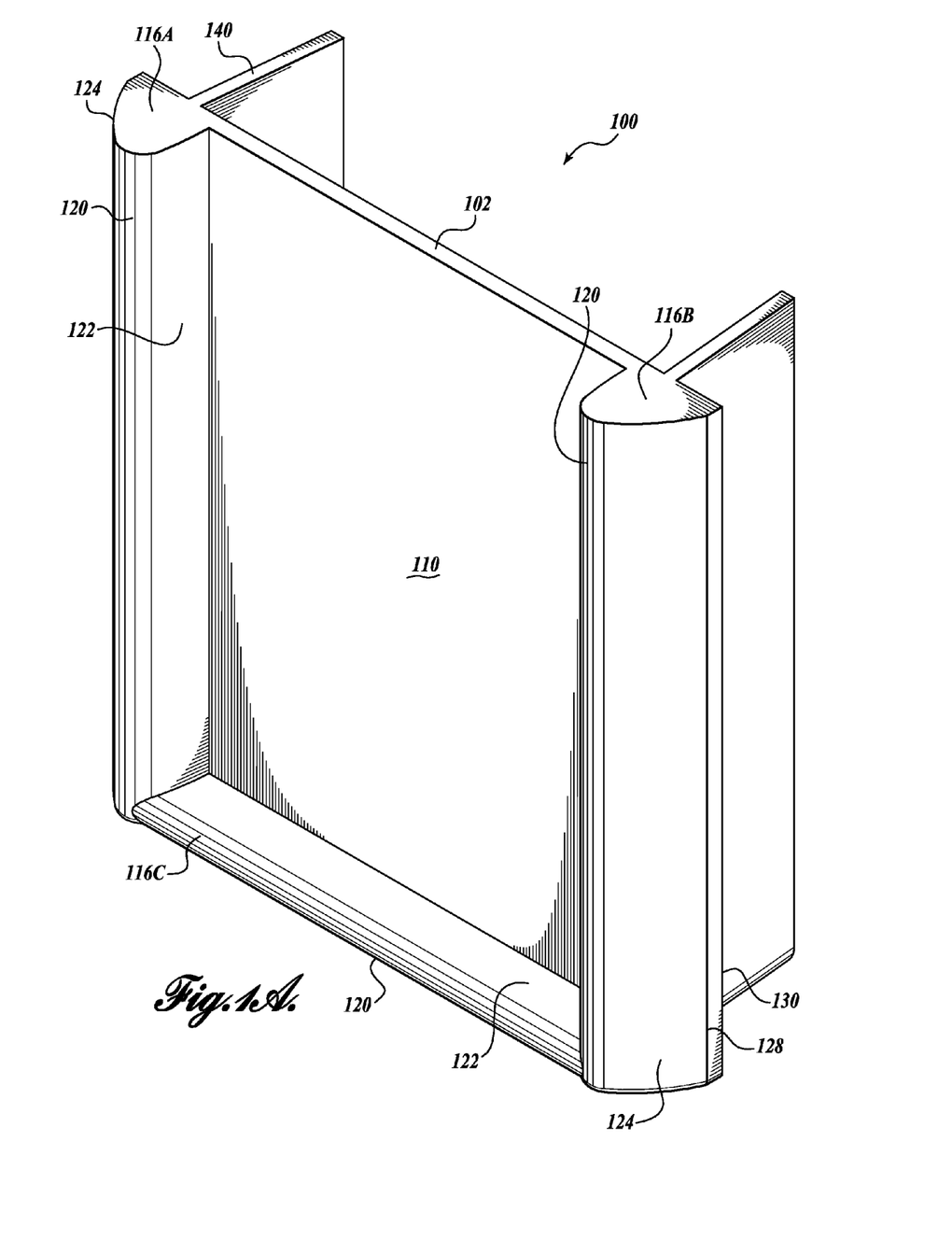
FIG. 1A is a front isometric view of one embodiment of a splash guard in accordance with aspects of the present disclosure.
Figure 1B:
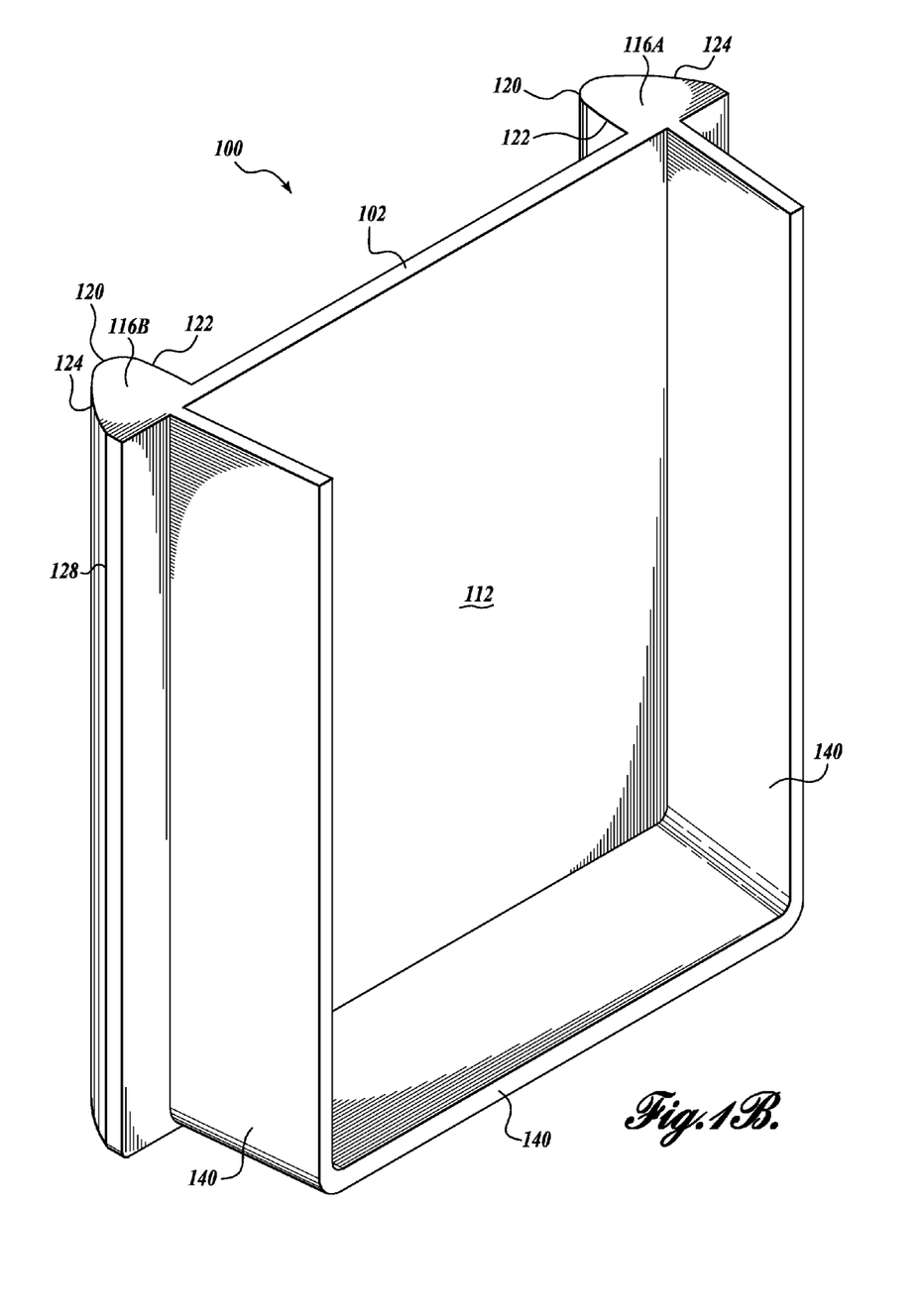
FIG. 1B is a rear isometric view of the splash guard of FIG. 1A.

A splash guard 100 in accordance with one embodiment of the present disclosure may be best understood by referring to FIGS. 1A and 1B. In the illustrated embodiment, the splash guard 100 includes a substantially planar body 102 having opposite first and second surfaces 110 and 112. Although the illustrated embodiment shows the planar body 102 as being substantially rectangular in shape, it is to be appreciated that other suitable shapes may be used. Non-limiting examples include square, octagonal, pentagonal, or other suitable shapes. The splash guard 100 or any part thereof may be constructed of a flexible material. For instance, in one embodiment, the splash guard 100 is constructed of neoprene, natural rubber, or the like.

Extending outwardly from at least a portion of the first surface 110 of the planar body 102 at or near its perimeter is one or more members 116. In the embodiment shown, three (3) members 116A-C are provided at the sides and bottom of the planar body 102. The side and bottom members each include a crest or apex 120, an inner surface 122 and an outer surface 124. The outer surface 124 extends from the apex 120 to an outer edge 128 while the inner surface 122 extends from the apex 120 to the first surface 110. As will be described in more detail below, the first surface 110 faces forward when the splash guard 100 is attached to the associated vehicle so that the apex 120 of the members 116 forms the leading edge(s) of the splash guard 100.

In the embodiment shown in FIGS. 1A and 1B, the outer surface 124 of members 116A and 116B or portions thereof may be curved in a convex shape from the apex 120 to the outer edge 128. Alternatively, the curved outer surface 124 may curve from the apex 120 to a second outer edge 130. The radius of the curvature may be any amount to transition the apex 120 to the outer edge 128 or to the second edge 130. In some embodiments, the radius of curvature may vary along the perimeter of the splash guard. For instance and as is shown in the illustrated embodiment, the radius of curvature along the vertical members 116A and 116B of the splash guard 100 may be different from the radius of curvature along the bottom member 116C of the splash guard 100. In yet another embodiment, the outer surface of the bottom member 116C may not be curved but rather planar in configuration. The curved outer surfaces 124 of the members 116 may be configured to improve air flow around the splash guard 100 thereby reducing drag forces caused by the splash guard 100. In an alternative embodiment, the outer surfaces 124 may be generally planar and slope radially outward from the apex 120 to either the outer edge 128 or second edge 130.

The inside surfaces 122 of the members 116 may be generally planar (as shown), concave, or convex. In other embodiments, the first surface 110 of the planar body 102 may be flush with the apex 120 of the members 116 thereby eliminating the inner surfaces 122.

Turning now to FIG. 1B, one or more plate-like protrusions 140 extend outwardly from the second surface 112 of the planar body 102. In the illustrated embodiment, the one or more protrusions 140 are a plurality of interconnected protrusions arranged and configured so as to form a boat tail. In some embodiments, the protrusions 140 may be tapered inwardly as they extend outwardly of surface 112. The protrusions 140 may be integrally formed with the planar body 102 or attached thereto by mechanical or chemical fasteners, heat bonding, or the like. Likewise, the members 116 (FIG. 1A) may be integrally formed with the planar body 102 or attached thereto by mechanical or chemical fasteners, heat bonding, or the like. Although not shown in the illustrated embodiment, a protrusion 140 may also extend across the top of the second surface 112 of the planar body 102.

Figure 2A:
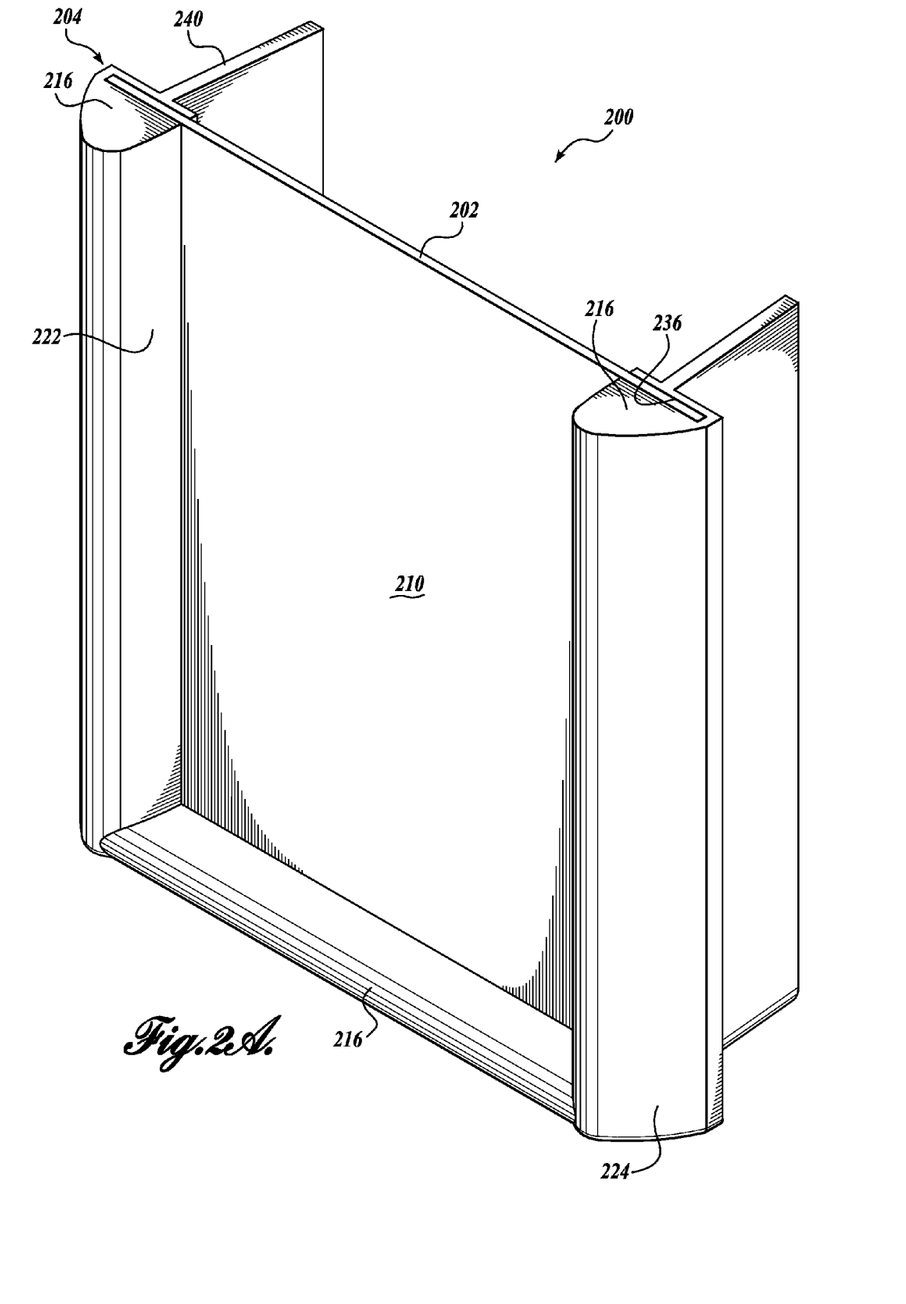
FIG. 2A is a front isometric view of another embodiment of a splash guard in accordance with aspects of the present disclosure.
Figure 2B:
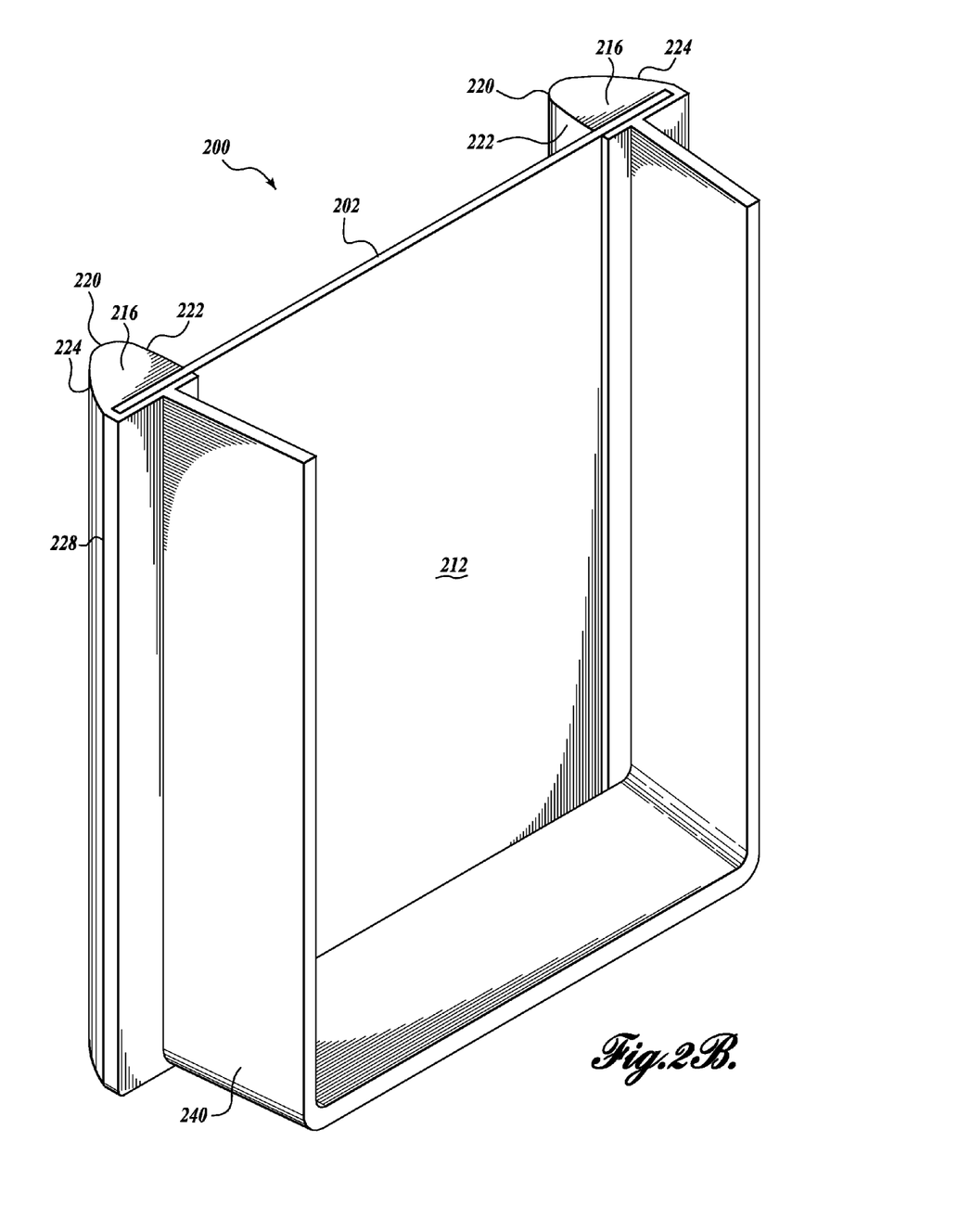
FIG. 2B is a rear isometric view of the splash guard of FIG. 2A.
Figure 3:
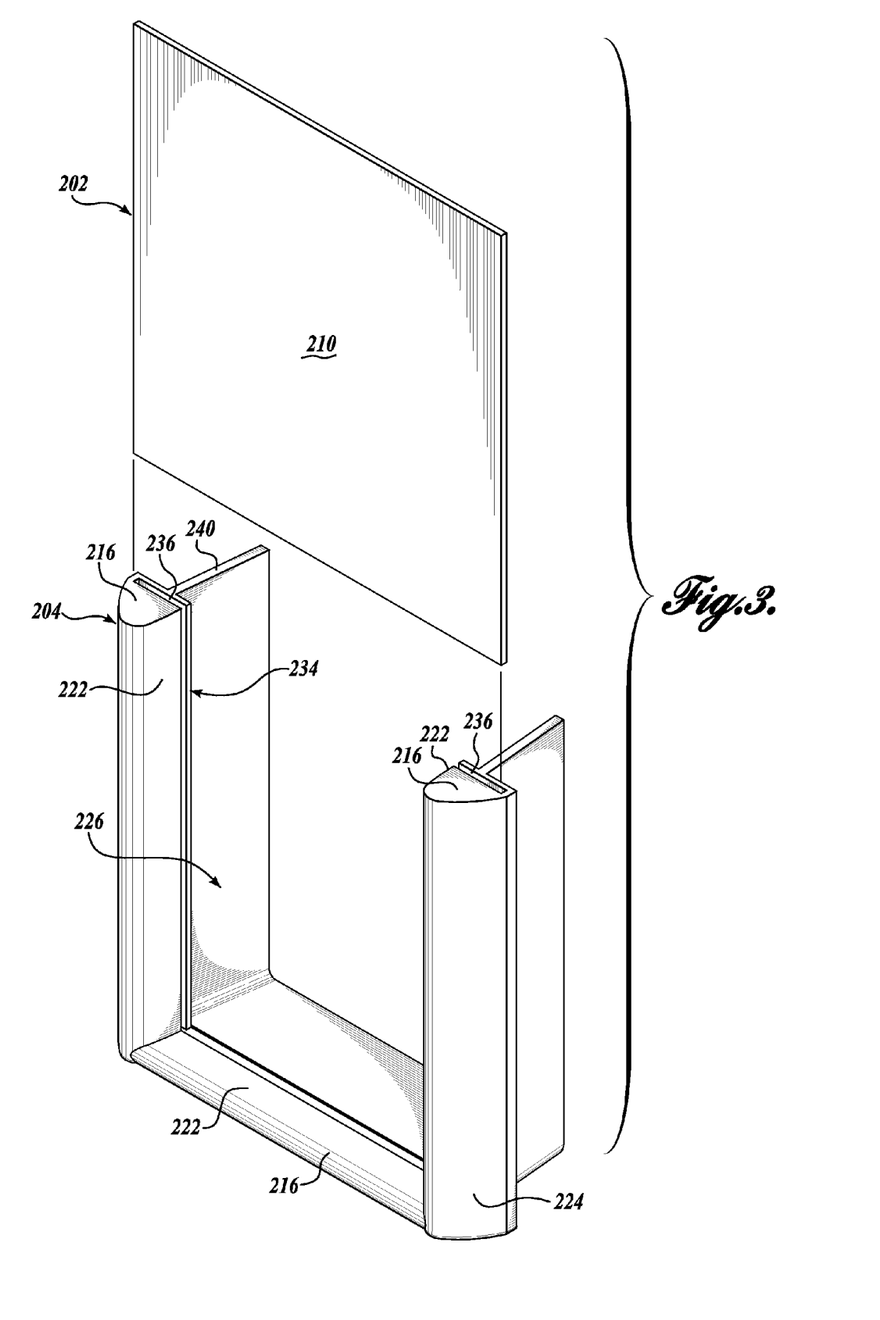
FIG. 3 is an exploded view of the splash guard of FIGS. 2A and 2B.

In some embodiments, the splash guard 100 may be a unitary device. In other embodiments, the splash guard 100 may be formed from two or more discrete components, which are removably secured to each other. For example, another embodiment of a splash guard 200 formed in accordance with aspects of the present disclosure is shown in FIGS. 2A-2B, and 3. As best shown in FIGS. 2A-2B, and 3, the splash guard 200 includes a planar body 202 and a frame 204, also referred to herein as a splash guard adaptor. In the embodiment shown, the frame 204 includes members 216 arranged in a generally U-shaped configuration, thereby forming an opening 226. The opening 226 is suitably sized and configured to receive the planar body 202 therein. Although the illustrated embodiment shows the planar body 202 and the opening 226 being of substantially rectangular shape and the frame 204 being generally U-shaped, it is to be appreciated that other suitable shapes may be used. Non-limiting examples include square, octagonal, pentagonal, or other suitable shapes.

In the embodiment shown, the inner surfaces 222 of the frame 204 may include an attachment interface 234 so as to secure the planar body 202 to the frame 204. For example, an attachment interface in the form of slots 236 may be formed along the inner surfaces 222. The slots 236 have a width and a depth sufficient to receive and retain the edges of the planar body 202. To assemble, the outer edges of the planar body 202 slides into the slots 236, as best illustrated in FIG. 3. In other embodiments, the planar body 202 may be alternatively secured to the frame 204 by mechanical or chemical fasteners, heat bonding, etc. In one embodiment, the planar body 202 is a standard sized splash guard currently provided on commercial vehicles, such as Class 8 trucks. In such an embodiment, the frame 204 may be formed from a continuous extrusion that wraps around the edges of the conventional splash guard. The splash guard or any part thereof may be constructed of a flexible material. For instance, in one embodiment, the planar body 202 and/or the frame 204 are constructed of neoprene, natural rubber, or the like.

Figure 4:
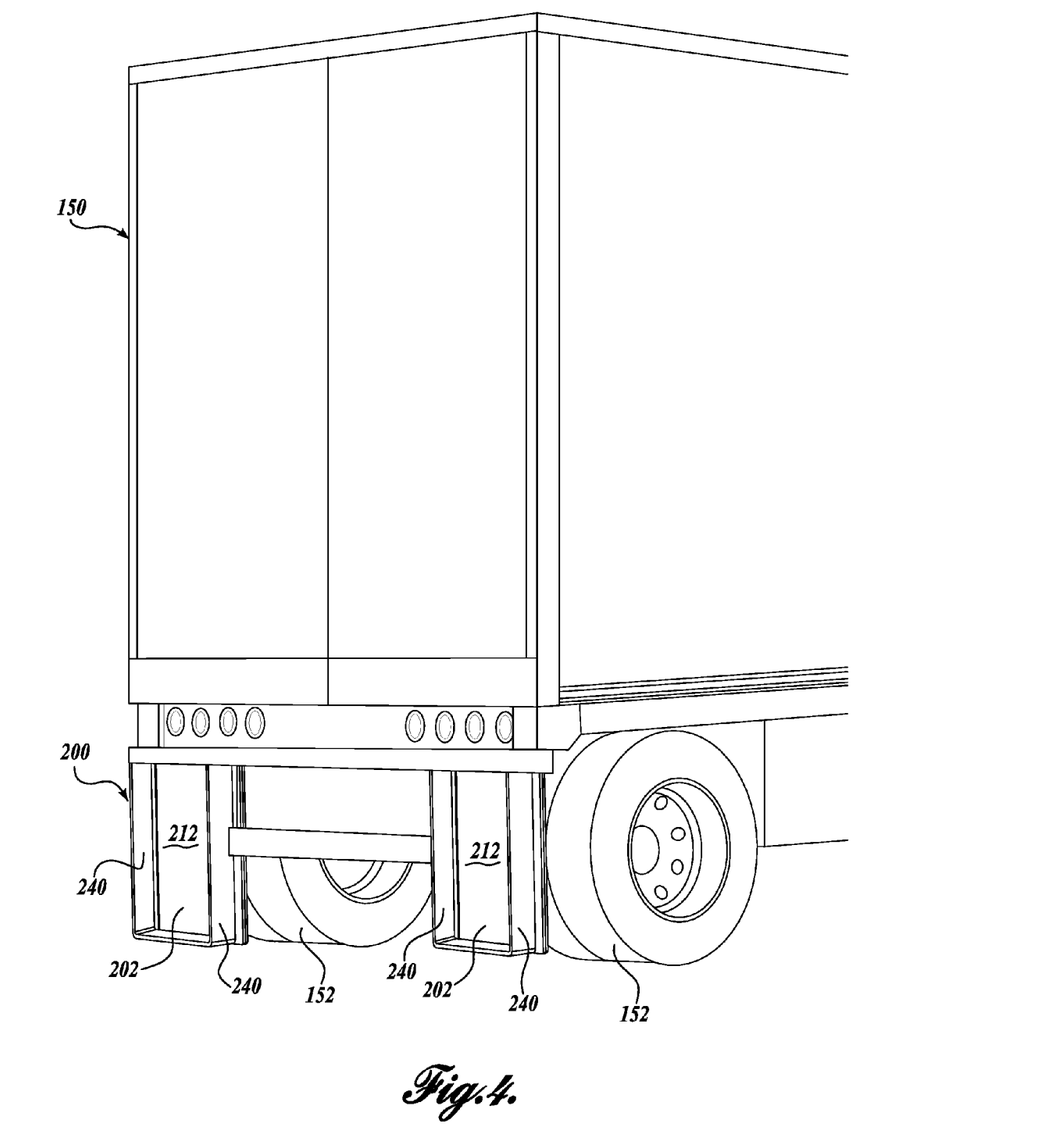
FIG. 4 is a partial, schematic illustration of a vehicle with the splash guard of FIGS. 2A and 2B mounted thereon.

Turning now to FIG. 4, there is shown a vehicle 150 having the splash guard 200 of FIGS. 2A, 2B, and 3 mounted thereon. As is illustrated, the first surface 210 (hidden in FIG. 4) of the planar body 202 is positioned behind and spaced apart from the vehicle's tires 152. That is, the first surface 210 of the planar body 202 is forwardly facing and the second surface 212 of the planar body 202 is rearwardly facing relative to the front of the vehicle 150. As discussed above, the splash guard 200 may be secured to or otherwise associated with a portion of the vehicle 150, such as the vehicle's frame, fender, trailer, or the like, such that the planar body 202 extends vertically behind the vehicle's tire 152.

Figure 5:
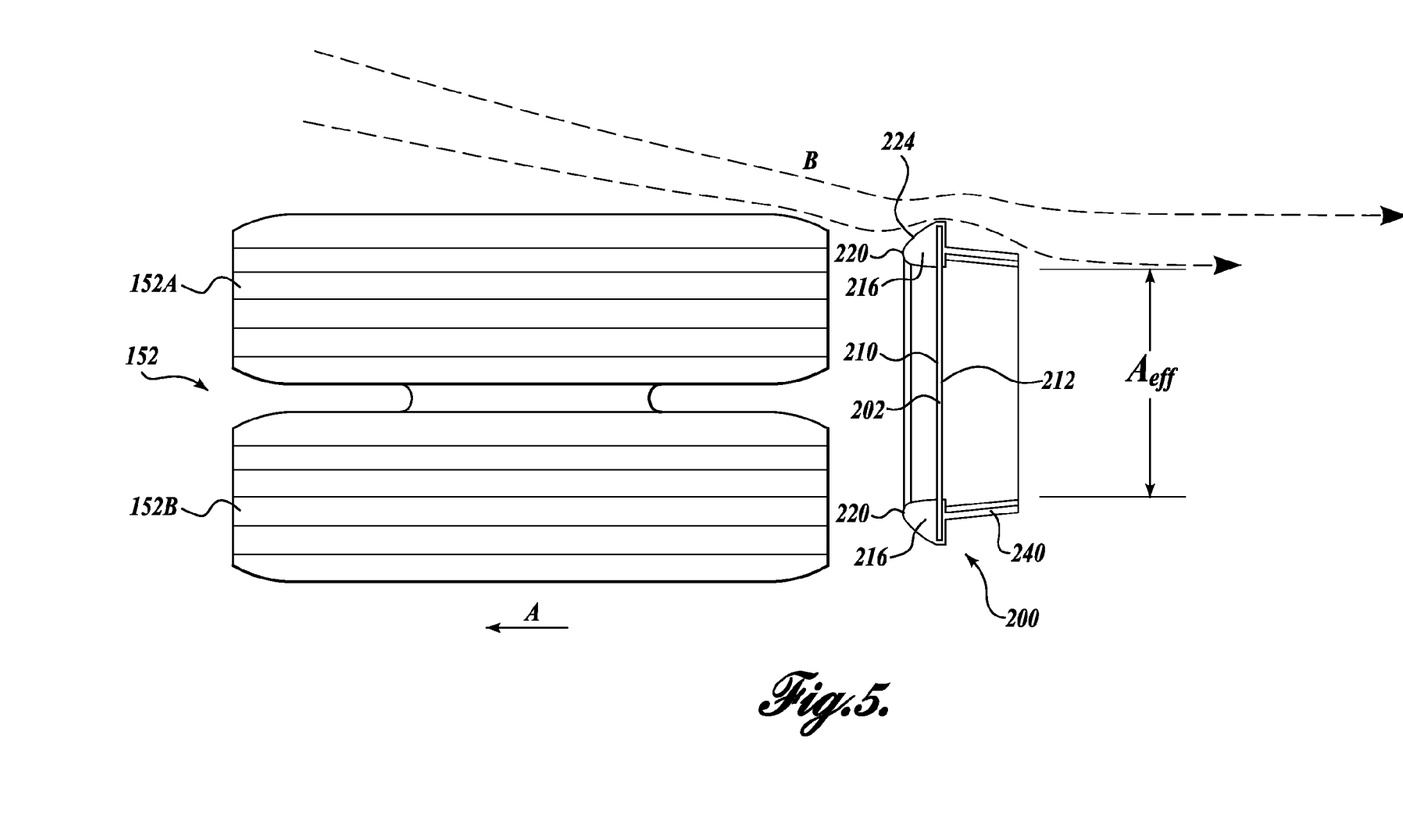
FIG. 5 is a partial plan view of the splash guard of FIG. 2A installed on a vehicle illustrating air flow around the splash guard when the vehicle is moving.

One or more of the members 216 (hidden in FIG. 4) extending from the first surface 210 in combination with one or more protrusions 240 extending from the second surface 212 may be configured to affect air flow characteristics around the splash guard 200. Turning now to FIG. 5, there is shown a partial plan view of the splash guard 200 of FIGS. 2A and 2B installed behind the vehicle's tires 152 illustrating air flow in the direction of arrows B around the splash guard 200 when the vehicle is moving in the direction of arrow A. The tires 152 include an outside tire 152a and an inside tire 152b. As can be seen in FIG. 5, the effective area, $A_{eff}$, of the splash guard 200 is less than the width of the splash guard 200 due at least in part to the apex 220, curved outer surfaces 224 and/or the one or more protrusions 240, thereby reducing the overall drag forces on the vehicle.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The invention claimed is:

1. A vehicle splash guard comprising:
 a substantially planar body having a front surface and a rear surface opposite the front surface;
 one or more curved outer surfaces positioned radially outwardly of the front surface, the one or more curved outer surfaces extending from a leading edge to trailing outer edge; and
 a plurality of protrusions extending outwardly from the rear surface, wherein the plurality of protrusions are tapered inwardly as they extend rearwardly from the rear surface.

2. The vehicle splash guard of claim 1, wherein the plurality of protrusions form a boat tail.

3. The vehicle splash guard of claim 1, wherein the plurality of protrusions are integrally formed with the substantially planar body.

4. The vehicle splash guard of claim 1, wherein the one or more curved outer surfaces extends along a portion of the perimeter of the planar body.

5. An adaptor for a vehicle splash guard, the adaptor comprising:
 a U-shaped frame having a first side and a second side opposite the first side, the first side having one or more convex-shaped outer surfaces that extend from a leading edge to an outer trailing edge, the second side having one or more protrusions extending outwardly therefrom, the frame having an attachment interface configured to secure the adaptor to a vehicle splash guard.

6. The adaptor of claim 5, wherein the first side has a plurality of convex-shaped outer surfaces and the second side has a plurality of protrusions.

7. The adaptor of claim 6, wherein the plurality of protrusions are tapered inwardly as they extend away from the second side.

8. The adaptor of claim 5, wherein the attachment interface includes one or more slots formed in the frame and configured to receive a portion of the vehicle splash guard.

9. A vehicle splash guard assembly comprising:
 a substantially planar body having a forward surface and a rearward surface opposite the forward surface;
 a frame configured to be secured to the substantially planar body, wherein the frame includes a forward side and a rearward side, wherein the forward side of the frame includes one or more curved outer surfaces positioned radially outwardly of the forward surface of the planar body when the frame is secured to the substantially planar body, each outer surface extending from a leading edge to a trailing outer edge, and wherein the rearward side of the frame includes a plurality of protrusions that taper inwardly as they extend rearwardly therefrom.

10. A vehicle splash guard assembly comprising:
 a substantially planar body having a forward surface and a rearward surface opposite the forward surface;
 a frame configured to be secured to the substantially planar body, wherein the frame is U-shaped and includes a forward side and a rearward side, wherein the forward side of the frame includes one or more curved outer surfaces positioned radially outwardly of the forward surface of the planar body when the frame is secured to the substantially planar body, each outer surface extending from a leading edge to a trailing outer edge, and wherein the rearward side of the frame includes one or more protrusions extending outwardly therefrom.

11. The vehicle splash guard assembly of claim 9, wherein the one or more curved outer surfaces is convex shaped.

12. The vehicle splash guard assembly of claim 9, wherein the plurality of protrusions are contiguously connected.

13. The vehicle splash guard assembly of claim 9, wherein the frame includes one or more slots for receiving at least a portion of the substantially planar body and securing the frame to the substantially planar body.

14. The vehicle splash guard assembly of claim 9, wherein the substantially planar body is a preexisting vehicle splash guard.

* * * * *